(12) United States Patent
Essig, Jr. et al.

(10) Patent No.: US 7,726,906 B2
(45) Date of Patent: Jun. 1, 2010

(54) SYSTEMS AND METHODS FOR HARNESSING RESOURCES

(76) Inventors: John Raymond Essig, Jr., P.O. Box 3333, Fairfax, VA (US) 22038-3333; James Michael Essig, P.O. Box 3333, Fairfax, VA (US) 22038-3333

( * ) Notice: Subject to any disclaimer, the term of this patent is extended or adjusted under 35 U.S.C. 154(b) by 0 days.

(21) Appl. No.: 11/797,226

(22) Filed: May 1, 2007

(65) Prior Publication Data
US 2008/0034492 A1    Feb. 14, 2008

Related U.S. Application Data

(63) Continuation-in-part of application No. 11/254,023, filed on Oct. 20, 2005, now Pat. No. 7,612,735, which is a continuation-in-part of application No. 10/729,145, filed on Dec. 4, 2003, now Pat. No. 7,382,332, which is a continuation-in-part of application No. 10/156,814, filed on May 30, 2002, now Pat. No. 6,897,832.

(60) Provisional application No. 60/796,741, filed on May 1, 2006.

(51) Int. Cl.
*E02B 13/00* (2006.01)
(52) U.S. Cl. .......................... 405/52; 405/53
(58) Field of Classification Search .................. 405/52, 405/53, 55; 4/488, 504, 498
See application file for complete search history.

(56) References Cited

U.S. PATENT DOCUMENTS

| | | | | |
|---|---|---|---|---|
| 3,184,764 A | * | 5/1965 | West | 4/498 |
| 3,517,513 A | * | 6/1970 | Trippe et al. | 405/52 |
| 3,707,007 A | * | 12/1972 | Trostler | 4/500 |
| 3,730,120 A | * | 5/1973 | Dobell | 114/256 |
| 3,890,934 A | * | 6/1975 | Walcott | 119/78 |
| 4,233,695 A | * | 11/1980 | Rowney | 4/498 |
| 4,527,927 A | * | 7/1985 | Bucherre | 405/53 |
| 5,107,552 A | * | 4/1992 | Lavalliere et al. | 4/498 |
| 5,924,144 A | * | 7/1999 | Peterson | 4/488 |
| 6,436,283 B1 | * | 8/2002 | Duke | 210/172.1 |
| 6,606,752 B2 | * | 8/2003 | Marbach | 4/498 |
| 6,684,813 B1 | * | 2/2004 | Lemon | 119/69.5 |
| 6,897,832 B2 | * | 5/2005 | Essig et al. | 343/912 |
| 7,494,572 B2 | * | 2/2009 | Tonkin et al. | 210/640 |
| 2004/0040082 A1 | * | 3/2004 | Fireman et al. | 4/506 |
| 2005/0103329 A1 | * | 5/2005 | Essig et al. | 126/697 |

* cited by examiner

*Primary Examiner*—Frederick L Lagman

(57) ABSTRACT

A precipitation (e.g., rain, snow, sleet, etc.) harvesting apparatus 3000 comprising a basic storage chamber or cistern 3002, which comprises an open vessel 3003 (such as a children's inflatable pool) and an optional primary catchment membrane 3004 which is placed over and attached to the open vessel 3003 to form the storage chamber 3002. An optional extended membrane 3005 is shown extending upward and away from vessel 3003 and is shown optionally supported by optionally inflatable or collapsible support tubes 3006 which are in turn fastened to the ground 3008 or other surface on which the apparatus 3000 is resting using tie lines, cables, strings and/or the like 3010 which are attached to ground stakes 3012. A liquid dispensing conduit 3014 is shown connected to and leading away from the storage vessel 3003 for draining harvested rainwater or other liquid 3016 contained within the storage chamber. The apparatus also includes a filter 3018 located, for example, in proximity to the center of the catchment membrane 3004, wherein the membrane has an opening or port 3017 optionally located in proximity to the center of the membrane 3004.

20 Claims, 1 Drawing Sheet

SYSTEMS AND METHODS FOR HARNESSING RESOURCES

CROSS-REFERENCE TO RELATED APPLICATIONS

This application is a continuation-in-part (CIP) of US continuation-in-part (CIP) U.S. patent application Ser. No. 11/254,023 of John R. Essig Jr and James M Essig filed 20 Oct. 2005, now U.S. Pat. No. 7,612,735 issued 3 Nov. 2009, which is a continuation-in-part of U.S. patent application Ser. No. 10/729,145 filed 4 Dec. 2003, now U.S. Pat. No. 7,382,332 issued 3 Jun. 2008, which is a continuation-in-part of U.S. patent application Ser. No. 10/156,814 filed 30 May 2002, now U.S. Pat. No. 6,897,832 issued 24 May 2005.

This application further claims the priority of U.S. Provisional Patent Application Ser. No. 60/796,741 filed 1 May 2006.

The entire specification and application (including Description, Drawing, and Claims) contained within each of these related applications, both as filed and as amended (where applicable), are hereby incorporated herein by reference.

FIELD OF INVENTION

The present invention relates to resource harnessing and/or management systems, and to methods of producing and using such resource harnessing and/or management systems, wherein the harnessed and/or managed resource may optionally include, as non-limiting examples, solar energy, rain or other precipitation, and/or water derived from municipal utilities, wells, springs, or other sources.

SUMMARY OF INVENTION

A primary embodiment of the invention comprises a resource harnessing apparatus (and method of using the apparatus) operable to harvest (e.g., capture or collect), store, purify, and/or dispense rain water or other forms of precipitation to provide potable water, and/or to harness other resources including but not limited to solar energy, RF and/or microwave communication signals, and/or the like, optionally using sub-ambient, ambient, and/or super-ambient pressurizable membranes.

Inventive aspects relate to: (a) optional food-grade material; (b) optional liner/food-grade liner; (c) extended membrane supported by peripheral elements (rigid, collapsible, sectioned, and/or inflatable tubes, rods, trusses, other members) further supported substantially directly by ground or other surface upon which device is resting or secured, (d) extended membrane not attached or not attached directly to cistern, (e) extended membrane that substantially covers primary membrane/vessel cover (f) extended membrane attached to cistern via conduit optionally with in-line or otherwise connected debris screen, filter, purifier, sterilizer, valve, pressure controller, water level controller, and/or first-flush device, (g) first flush device (not part of conduit; (h) settling pot/debris removal or purge element; (i) simple optionally flat storage bag with inlet and/or outlet, optionally one-way inlet, optionally Visible-light/UV Transparent for inspection/SODIS.

The instant invention also comprises a converting apparatus and methods of using such converting apparatus for adapting or converting an optionally open vessel or container (non-limiting examples of which include a swimming pool, wading pool, or other vessel that is optionally portable and/or optionally inflatable or otherwise collapsible), to form such a resource harnessing and/or management apparatus, which can harvest (e.g., capture or collect), store, purify, and/or dispense various resources (e.g., precipitation, building roof or land runoff, water from intermittent municipal sources, springs, other sources of water or other material, etc.), and which optionally comprises food-grade material to render a potentially non-sanitary vessel suitable for providing potable water, other consumable materials, and/or items which need to be protected from contamination.

According to the spirit of the invention, the basic invention, in at least one of its several configurations, comprises a combination cistern liner (optionally food-grade or potable-water-contact-grade) for use with a portable (optionally inflatable and/or collapsible) cistern.

The invention includes optional configurations that are multifunctional in the sense that the inventive apparatus can hold water as a first function, and as a second function, can capture, filter, process, dispense, sterilize, and purify water.

Of a high level of importance is the optional configuration of the apparatus comprising a cistern liner, optionally food grade, for use with a portable pool, a good non-limiting example of which is a small inflatable pool for children often referred to as a "kiddy" pool. Non-limiting examples of such pools for children are those produced by companies such INTEX, AQUALEISURE, SEVYLOR, and the like.

Alternatively, the cistern liner is optionally usable to convert a household appliance, fixture, accessory and the like which is usable for a first function into a cistern usable for a second function including but not limited to holding, capturing, filtering, processing, sterilizing, and/or purifying water. Non-limiting examples of such convertible household articles include sinks, tubs, shower stalls, buckets, and umbrellas deployed and optionally inverted and supported by an inflatable, collapsible, or rigid ring.

FIRST MAIN EMBODIMENT APPARATUS

Figure 1:
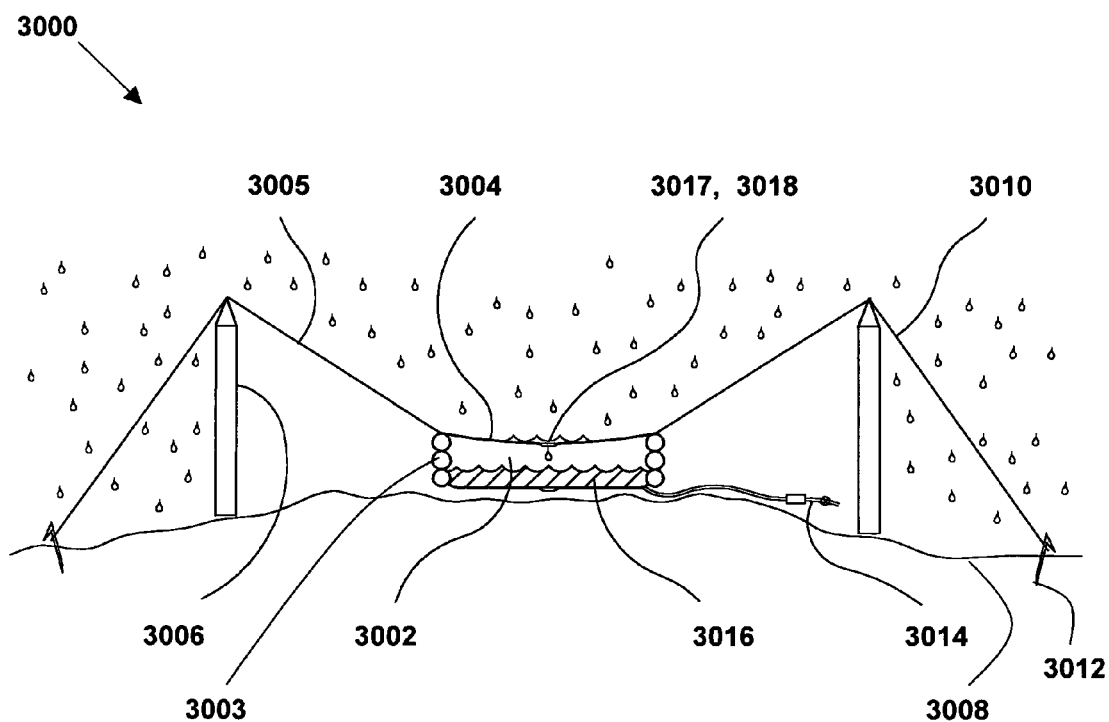
FIG. 1 shows a side elevational cross-sectional view of a precipitation harvesting apparatus according to the present invention.

FIG. 1 shows a side elevational cross-sectional view of a precipitation (e.g., rain, snow, sleet, etc.) harvesting apparatus 3000 comprising a basic storage chamber or cistern 3002, which comprises an open vessel 3003 (such as a children's inflatable pool) and an optional primary catchment membrane 3004 which is placed over and attached to the open vessel 3003 to form the storage chamber 3002. An optional extended membrane 3005 is shown extending upward and away from vessel 3003 and is shown optionally supported by optionally inflatable support tubes 3006 which are in turn fastened to the ground 3008 or other surface on which the apparatus 3000 is resting using tie lines, cables, strings and/or the like 3010 which are attached to ground stakes 3012. A liquid dispensing conduit 3014 is shown connected to and leading away from the storage vessel 3003 for draining harvested rainwater or other liquid 3016 contained within the storage chamber. The apparatus also includes a filter 3018 located, for example, in proximity to the center of the catchment membrane 3004, wherein the membrane has an opening or port 3017 optionally located in proximity to the center of the membrane 3004. Note that the liquid catchment membrane is optionally integrally attached or removably attached to the storage chamber 3002 by a circumferential attachment mechanism (not shown), non-limiting examples of which include: 1) a bungee or other type of elastic cord; 2) a cord, string, rope, cable, and the like with optional synching means; 3) a zip tie with optional keyed release system for security purposes; 4) tongue-and-groove sealing mechanism (e.g., a "zip-lock" sealing mechanism); 5) a hook and loop fastening mechanism such as one or more Velcro patches; and/or 6) any of the other attachment mechanisms mentioned or described within the above referenced applications which are herein incorporated by reference. Also note that the catchment membrane can optionally generally serve as a cover to keep the water within the storage vessel pure.

Examples of Alternate Open Vessels

Non-limiting examples of alternate open vessels 3003 include portable pools having an inflatable wall or a rigid wall, or a permanent pool, generally having rigid walls. Other storage chambers may optionally be used to store liquid, other foodstuffs, and the like. The optional storage chambers include any of the impermeable chambers mentioned, depicted and/or described within the above referenced applications which are incorporated herein by reference and/or any such chambers known to the reader of this document, the above referenced patents or patent applications, or otherwise made known to the user of the instant invention.

Examples of Food-Grade Materials

There are many types of food-grade materials out of which the food grade-liner and/or the liquid handling components can be constructed. Non-limiting examples of such materials include the following types approved by the U.S. Food and Drug Administration (FDA) and the U.S. Department of Agriculture (USDA) except where noted otherwise; ABS acrylonitrile-butadiene-styrene, Acetal Copolymer, Delrin (acetal homopolymer), Ertalyte PET-P (polyethylene terephthalate-polyester) natural color, Ertalyte PET-P (polyethylene terephthalate-polyester) black color, Ertalyte TX lubricated PET-P, Hydex 4101 PET-P (polybutylene terephthalate-polyester) natural color, Hydex 4101 PET-P (polybutylene terephthalate-polyester) black color, Hydex 4101L (lubricated PET-polyester) natural color, Kynar PVDF (polyvinylidene fluoride), MC907 (cast nylon 6), Noryl PPO (modified polyphenylene oxide-styrene), Nylon (extruded type 6/6), polyethylene LDPE—low density [FDA only], polyethylene LDPE—high density, polyethylene UHMW—ultra high molecular weight, Polypropylene (homopolymer), Polysulfone (food grade only) and the like. The above food grade materials where selected from a web based document entitled "Agency Approved Plastic Materials" Copyright of Boedeker Plastics, Inc. and is not an exhaustive listing of the FDA and USDA approved materials Optional Alternate Characteristics of Membranes The membranes of the instant invention can optionally have one or more or any combination of the following features or characteristics including, as non-limiting examples: 1) a port or orifice on the upper catchment membrane; 2) a valve; 3) a filter; 4) a membrane which forms part of a removable chamber wherein the membrane is an optionally food-grade liner or vessel optionally further including either a food grade or non-food grade port; 5) optical characteristics, non-limiting examples of which include degrees of transparency, opacity, translucency, reflectivity, selective transmissivity, emissivity, diffusivity, color, patterns, textures, indicia, images, light polarizing capacity; 6) physical characteristics including but not limited to high modulus of elasticity, high strain but low modulus of elasticity, fiber reinforced composition, multi-sheet layered construction wherein sheets of differing complementary characteristics are combined, heat resistance, combustion resistance, chemical resistance; 7) antibacterial growth surface material; 8) insulation (thermally, optically, and/or an oxygen barrier); 9) debris trap or screen (settling pot) (Note: in particular that this feature also optionally applies to the lower membrane of the chamber and that the debris trap can optionally be a removable screen or mesh, or a debris removal or purge device, e.g., valve); 10) a dispensing conduit (optionally with screens, valves, filters); 11) a sterilizing means, non-limiting examples of which include: ultra-violet light emitters, ultraviolet light activated titanium-dioxide-based free radical production mechanisms, ozonators, chlorinators, iodizers; electrostatic precipitators, thermal pasteurizers; distillation apparatus; 12) pumps (electric, mechanical, manual); 13) over pressure valves; 14) and a "first flush" system.

Alternate Geometric Relationships Between Membrane and Cisterns

An extended or auxiliary catchment membrane may optionally be provided with the resource harnessing apparatus wherein the extended or auxiliary membrane is an extension of the primary catchment membrane or wherein the auxiliary membrane is a separate membrane either disposed in proximity to the primary membrane or disposed some distance from the primary membrane wherein the captured water is optionally transferred to the cistern or storage vessel by an optional conduit or other fluid conveyance means.

Alternate In-Situ Objects to which the Extended Membranes May Optionally be Attached The extended membranes can be supported by peripheral edge supports which optionally include mechanical attachment(s) to proximate item(s) in the environment, non-limiting examples of which include, a tree, a post, a house, a fence, a railing, and the like. Alternatively, the extended membranes can be supported by one or more elements of the device, non-limiting examples of which include a rigid rod or tube, a foldable and unfoldable locking tube or rod, a telescoping tube, a scissor jack support, a shock corded tube composed of multiple segments, an inflatable tube, a spring loaded flexible self erecting structure, inflatable ring(s), and a platform.

Membranes Operable to Harness Electromagnetic Energy

Resource harnessing apparatuses of the instant invention may contain electromagnetic energy concentrating reflectors as the primary membrane, whereby the resource harnessing apparatuses can harness radiant solar energy. The concentrating reflectors optionally have a parabolic cross section (i.e., paraboloidal in shape) for maximum degree of energy concentration. However, parabolic reflectors may optionally have a very short focal length to mitigate the risk of unintentional contact by the operator of the device from highly concentrated sunlight when the device is being used to concentrate solar energy. Alternatively, non-parabolic concentrating reflectors (e.g., reflectors having surfaces which are spherical, undulating, dimpled, faceted, or which comprise a series of conic sections, and the like) is contemplated to limit the maximum degree of concentration to further enhance safety and/or to provide more uniform heating. Reflecting membranes of the apparatus may have any of the configurations of the membranes of the apparatuses mentioned, depicted, or described in the above cross-references applications for which all of the inventive concepts, apparatuses, and methods of these cross referenced applications are incorporated herein by reference.

Objects Locatable at Focal Point of Solar Concentrating Membranes

Various non-limiting examples of solar energy harnessing accessory elements that may be integrally or removably incorporated into the instant invention include: a solar oven or autoclave having a high-emissivity (generally blackened) energy-absorbing external surface; various two-sided cooking accessories integrally or removably attached to the apparatus such as flat griddle plates, waffle irons, pie irons; thermally (e.g., convectively and conductively) insulated cooking vessels; and turboelectric, thermoelectric, and/or photoelectric devices.

Focal Point Supports

Non-limiting examples of various elements that may optionally be integrally or removably incorporated into the instant invention for holding items or materials at the focal point of the reflector include cable stayed focal points supports (i.e., assemblages of cables attached to an optional safety cage and/or the reflector and operable to hold accessories in proximity to the focal point of the apparatus), rotisseries substantially diametrically spanning the concentrating reflector, and focal point supports otherwise comprising one or more rigid elements.

Energy Conditioning Elements

Non-limiting examples of energy conditioning apparatus that may optionally be integrally or removably incorporated into the instant invention include; rectifiers, inverters, transformers, phase synchronizers, voltage matchers, switches, fuses, breakers, frequency controllers, charge controllers, power controllers and the like.

Non-limiting examples of energy distributing accessories that may optionally be integrally or removably incorporated into the instant invention include; electrical conduits, waveguides and light-pipes, conduits for carrying heated fluids and the like.

Energy Controlling Elements

Non-limiting examples of energy controllers that may be integrally or removably incorporated into the instant invention include; thermostats, voltage and electrical current controls, fluid pumps, electric motors, drivers, mechanical energy transmissions, gear sets, pulleys sets, and the like.

Automatic Sun Tracking Devices

Automatic sun tracking devices operable to provide single-axis and dual-axis tracking of electromagnetic sources may optionally be incorporated into the apparatus Securing Elements for Membrane Supports Optional elements for securing membrane supports include the following non-limiting examples: 1) a base attached to cistern assembly; 2) a base separately supported by and/or secured to the ground, roof, or other element secured by ground stakes, or any other mechanical means or weight ballasting means optionally stabilized by cables, ties, and the like.

Water Handling Accessories

The apparatus optionally can further incorporate one or more accessories for facilitating or enabling the collection, storage, processing, and/or distribution of collected precipitation. In particular, to further enhance the collection, storage, processing, and distribution of water or other liquids, it should be noted that various common liquid handling, processing, and/or dispensing devices can also optionally be integrally or removably incorporated into any apparatus of the instant invention in any useful quantity, location, and combination including, but not limited to, liquid pumps, pipes, tubes, conduits, hoses, connections to garden hoses, connection to plumbing systems, funnels, valves, pressure gauges, flow meters, flow controllers, filters, and other useful elements.

We claim:

1. A resource harnessing apparatus comprising:
   an open vessel; and
   a primary catchment membrane for capturing precipitation, said membrane having a means for transferring the captured precipitation into the vessel,
   wherein the apparatus is further characterized as having one or more items selected from the group consisting of:
   an extended catchment membrane;
   a primary filter;
   a second filter;
   a purifier;
   a sterilizer;
   a liquid dispensing device;
   a food-grade or potable-water-contact-grade liner; and
   a combination thereof, and
   wherein said one or more items comprises a sterilizing means selected from the group consisting of:
   an ultra-violet light emitter;
   an ultraviolet-light-activated titanium-dioxide-based free radical production mechanism;
   an ozonator;
   an iodizer;
   an electrostatic precipitator;
   a thermal pasteurizer; and
   a distillation apparatus.

2. The apparatus according to claim 1, wherein the open vessel is an inflatable pool.

3. The apparatus according to claim 2, wherein the primary membrane comprises a primary filter disposed to filter precipitation captured by the membrane.

4. The apparatus according to claim 1, wherein the primary catchment membrane, the vessel, or both comprise a food-grade material or potable-water-contact-grade material.

5. The apparatus according to claim 1, wherein the apparatus has an extended membrane that is an extension of the primary membrane.

6. The apparatus according to claim 1, wherein the apparatus has an extended membrane and further comprises peripheral elements for supporting the periphery of the extended membrane.

7. The apparatus according to claim 1, wherein the apparatus has an extended membrane and further comprises a conduit for transferring captured precipitation to the vessel.

8. The apparatus according to claim 6, wherein the apparatus has a primary filter attached to the primary catchment membrane, a second filter attached to a dispensing conduit, or both.

9. The apparatus according to claim 2, wherein the apparatus has a dispensing device selected from the group consisting of:
   a conduit;
   a conduit having a filter;
   a conduit having a valve; and
   a conduit having a filter and a valve.

10. The apparatus according to claim 1, wherein the apparatus is further characterized as having a liner comprising a food-grade material or potable-water-contact-grade material.

11. A resource harnessing apparatus comprising:
    a vessel; and
    a catchment membrane for capturing precipitation, said membrane having a means for transferring captured precipitation into the vessel, wherein the apparatus has an extended membrane and further comprises peripheral elements for supporting the periphery of the extended membrane; and wherein the apparatus is further characterized as comprising a food-grade material or a potable-water-contact-grade material.

12. The apparatus according to claim 11, wherein the apparatus is further characterized as having a liner comprising a food-grade material or potable-water-contact-grade material.

13. The apparatus according to claim 11, wherein the apparatus is further characterized as having a filter, a purifier, a sterilizer, or a combination thereof.

14. The apparatus according to claim 11, wherein the apparatus has a sterilizing means selected from the group consisting of:
   an ultra-violet light emitter;
   an ultraviolet-light-activated titanium-dioxide-based free radical production mechanism;
   an ozonator;
   an iodizer;
   an electrostatic precipitator;
   a thermal pasteurizer; and
   a distillation apparatus.

15. A method of producing a resource harnessing apparatus comprising the steps of:
   a) providing an open vessel;
   b) providing a catchment membrane operable to capture precipitation, said membrane having a means for transferring the captured precipitation into the vessel;
   c) providing an extended membrane further comprising peripheral elements for supporting the periphery of the extended membrane; and
   d) securing said catchment membrane over said vessel,
   wherein the apparatus so produced is operable to capture and store precipitation to provide water.

16. The method according to claim 15, wherein the open vessel is a pool.

17. The method according to claim 16, wherein the open vessel is an inflatable pool.

18. The method according to claim 15, wherein the apparatus comprises a food-grade liner or a potable-water-contact-grade liner.

19. The method according to claim 18, wherein the apparatus comprises a filter attached to the catchment membrane, a filter attached to a dispensing conduit, or both.

20. A resource harnessing apparatus comprising:
   an open vessel; and
   a primary catchment membrane for capturing precipitation, said membrane having a means for transferring the captured precipitation into the vessel,
   wherein the apparatus is further characterized as having:
   an extended membrane further comprising peripheral elements for supporting the periphery of the extended membrane; and
   one or more items selected from the group consisting of:
   a primary filter;
   a second filter;
   a purifier;
   a sterilizer;
   a liquid dispensing device;
   a food-grade or potable-water-contact-grade liner; and
   a combination thereof.

* * * * *